Aug. 16, 1960  A. A. JOHNSON  2,948,925
MACHINE AND METHOD FOR MOLDING HEAT-CURABLE ARTICLES
Filed Aug. 26, 1957  4 Sheets-Sheet 1
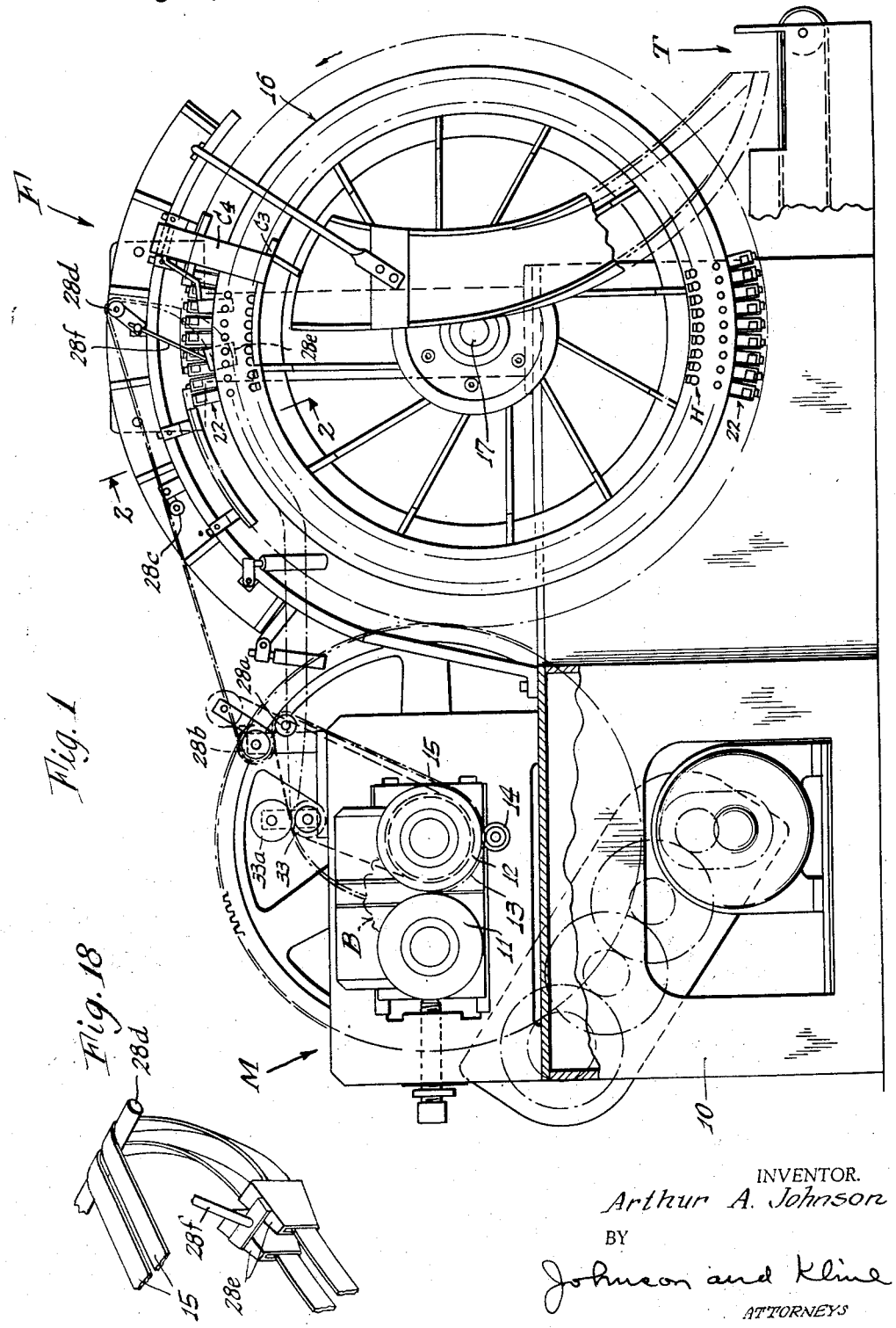
INVENTOR.
Arthur A. Johnson
BY
Johnson and Kline
ATTORNEYS Aug. 16, 1960    A. A. JOHNSON    2,948,925
MACHINE AND METHOD FOR MOLDING HEAT-CURABLE ARTICLES
Filed Aug. 26, 1957    4 Sheets-Sheet 2
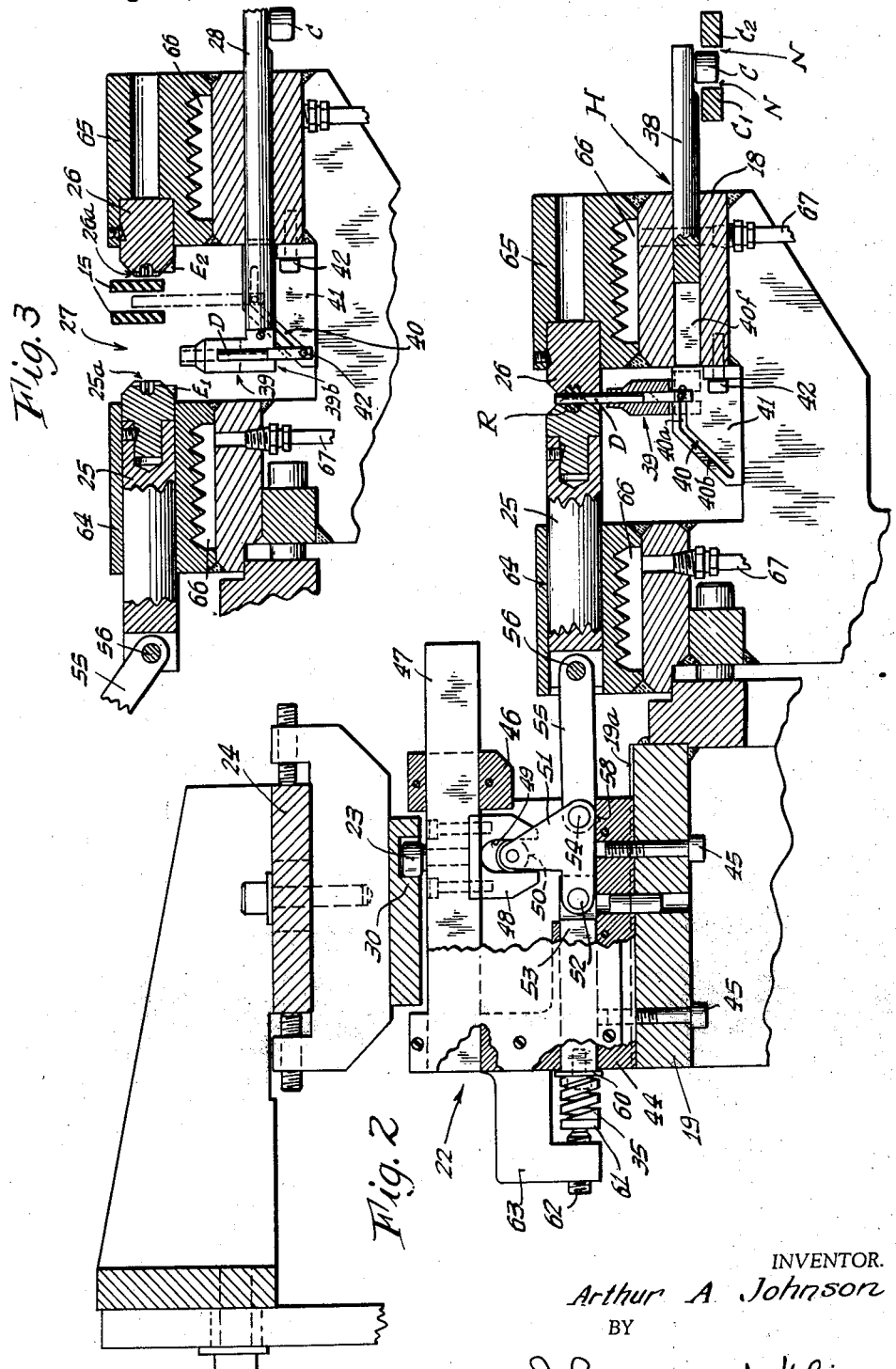
INVENTOR.
Arthur A. Johnson
BY
Johnson and Kline
ATTORNEYS

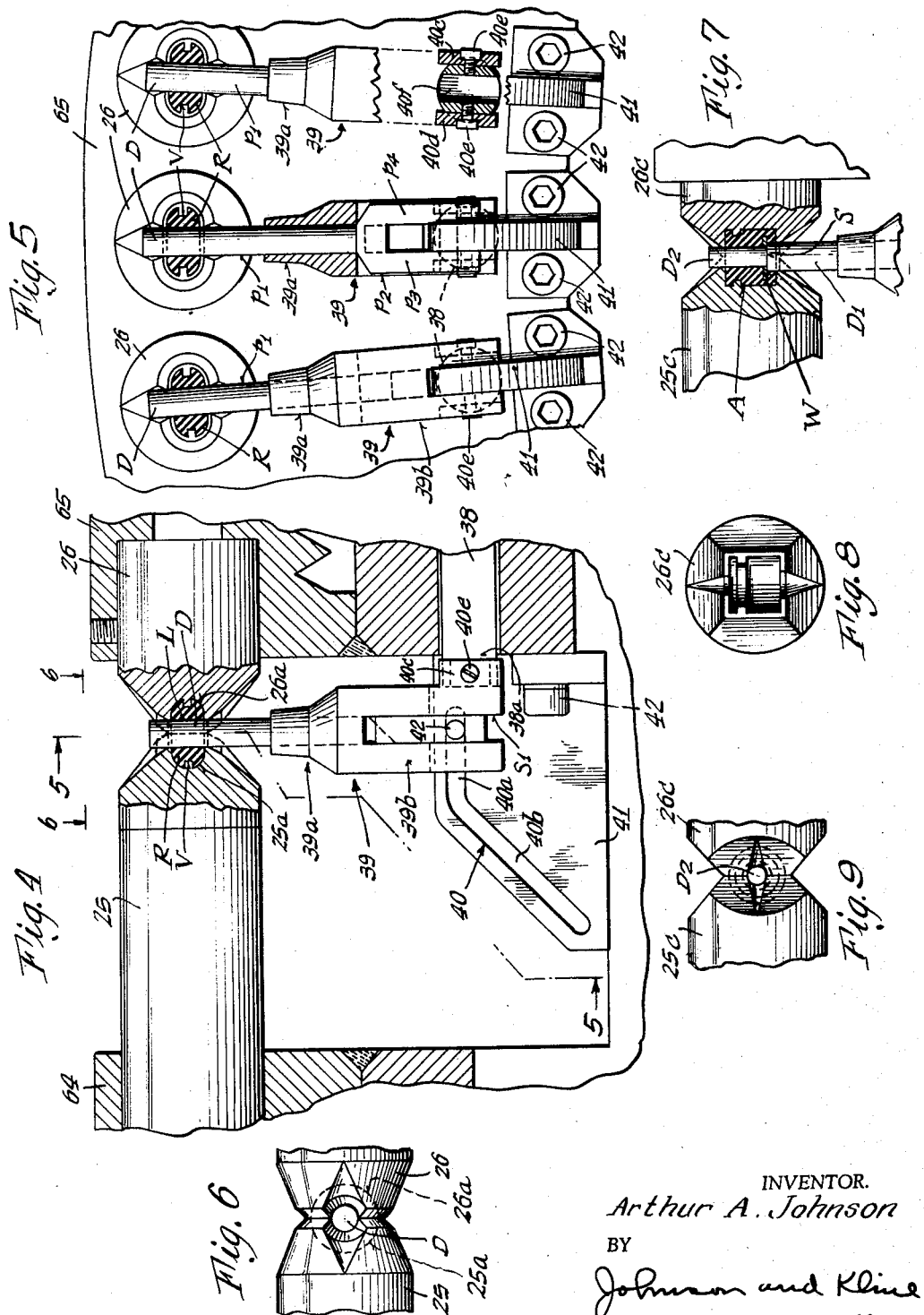

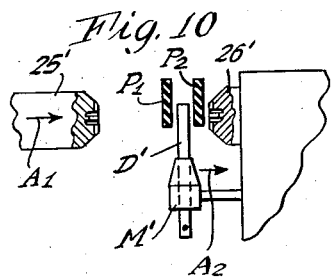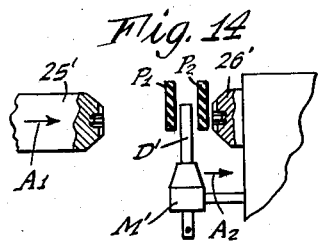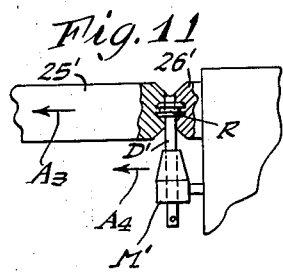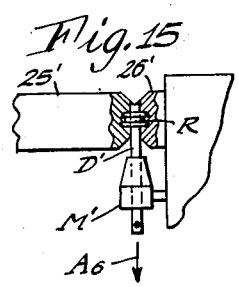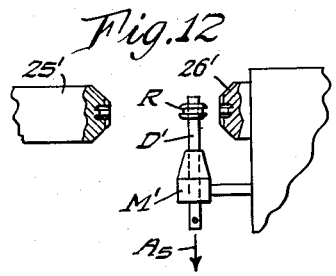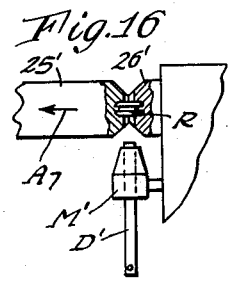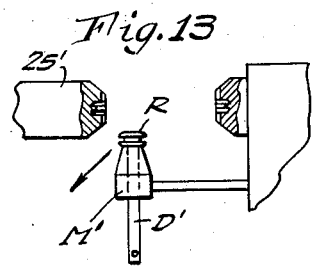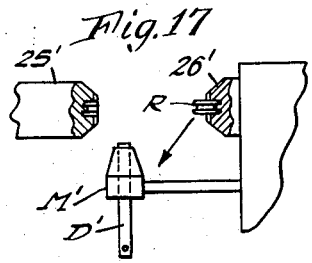

United States Patent Office 2,948,925
Patented Aug. 16, 1960

2,948,925

MACHINE AND METHOD FOR MOLDING HEAT-CURABLE ARTICLES

Arthur A. Johnson, Bridgeport, Conn., assignor to The Eagle-Picher Company, Cincinnati, Ohio, a corporation of Ohio Filed Aug. 26, 1957, Ser. No. 680,247

9 Claims. (Cl. 18—21)

This invention relates to methods and apparatus for continuously blanking as well as molding articles from a continuous strip of molding material fed continuously to the molding machine.

The invention is concerned with improvements in a continuous molding machine with the object of enabling such a machine to produce from the strip formed shapes heretofore not producible thereon.

The work strip consists of a plasticized or thermoplastic material, and articles formed therefrom are subjected after molding to heat-curing or vulcanizing treatment whereby they acquire the desired permanent set or permanent resiliency in the case of elastomeric material. The strip with the blanks pressed out and severed may be diverted from the machine as a perforated or skeletonized strip for reuse.

The machine disclosed to illustrate one embodiment of the invention comprises a plurality of identical, heated, individual relatively axially movable dies providing article-forming cavities and disposed in succession and traveling in a predetermined closed path, with the continuous supply strip joining this path tangentially and only long enough for the blanking operation to be performed upon the strip by the respective successive forming devices, after which the strip is diverted from the path of the individual forming dies. The formed articles themselves are retained by their respective forming dies along a major portion of the closed path, long enough to be released and discharged from the forming dies in a semi-cured and semi-stabilized state.

Heretofore, the use of the individual forming dies of such machines was limited in the forming and production of shapes having recesses disposed parallel or co-extensive with the axial line of movement of the forming dies because the articles are only semi-cured when released or rejected from their cavities. Those prior forming dies were not capable of producing articles having, in addition, one or more lateral recesses facing in a direction transversely of the line of opening and closing movement of the forming dies, because the recess-forming parts of the dies would render the semi-cured article not releasable from the cavities without permanent deformation.

An object of the present invention is to provide improved individual forming means together with operating controls therefor, enabling the continuous molding machine above referred to, to produce special or more complex shapes including those of characteristics above indicated. An example of such a special shape is a rubber grommet which is an article having a central hole and in addition a peripheral groove and thus has recesses angularly disposed relative to each other rendering the same non-releasable from the forming dies without deformation.

According to this invention, that object is attained by combining a pair of aperture-forming dies providing the article-forming cavity with an additional aperture-forming member interposed between the two forming dies and projecting into the article-forming cavity thereof.

In the case of the grommet, for example, in order to form the central hole therein as well as the peripheral groove, the invention in one of its embodiments provides a hole-forming core member which may be interposed between the two forming dies which in turn are provided with the groove-forming projections in their respective cavities. The grommet is formed as the dies close upon the strip of molding material and upon each other and also close around the core member, forcing the interposed molding material to fill the cavity and form the grommet.

After the cavity is filled, the remaining part of the molding material is removed and guided away from the dies.

After the grommet is semi-cured it is released and discharged for further curing by first opening the forming dies and then stripping of the grommet from the core member or vice versa, thereby completely removing the article from the molding parts without deformation.

Another feature of this invention is the provision of means whereby structural elements may be easily incorporated in the article being molded. For example, according to the present invention it is possible to so position a bushing or washer or other structural element that the molding material is flowed around it and it becomes embedded or at least contained in or on the molded article.

According to the present invention in its preferred form, these operations are performed automatically or continuously in desired sequence, but in the broader aspects of the invention the closing of the dies and the positioning of the third molding element may be manually operated or controlled.

Other features and advantages will hereinafter appear.

In the drawings:

Figure 1 is a side view of the molding machine embodying this invention, indicating the arrangement of the forming dies in a cyclic path showing the present invention as applied thereto.

Fig. 2 is a longitudinal section taken on line 2—2 of Fig. 1 showing the forming dies and the core member with control mechanism therefor, the parts being in position to mold and semi-cure a grommet.

Fig. 3 is a fragmentary view of parts of the mechanism shown in Fig. 2, showing with the parts in position when the formed article has been discharged, and with the supply strip positioned between the dies ready for the next forming and molding operation.

Fig. 4 is a further enlarged partial view showing the die members enclosing the article closed on the strip of molding material and the core member interposed between the dies.

Fig. 5 is a cross section taken on line 5—5 of Fig. 4 showing a plurality of adjacent spaced dies and core members.

Fig. 6 is a detailed top view of the forming dies, taken on line 6—6 of Figure 4.

Fig. 7 is a detailed vertical sectional view of the forming dies similar to that of Fig. 4, but adapted to mold a differently shaped article with metal washer molded into it.

Fig. 8 is a face view of one of the cavity forming dies.

Fig. 9 is a top view of the dies shown in Fig. 7.

Figs. 10 to 13 illustrate a sequence of operations effecting molding of the article and the release of the article from the forming dies and the subsequent stripping thereof from the third die member.

Figs. 14 to 17 illustrate an alternate sequence of article releasing operations.

Fig. 18 is a detail perspective view illustrating the novel feature of employing and guiding a pair of strips of the molding material to the molding units to straddle the core member thereof.

As shown in Fig. 1, the molding machine to which the present invention is applied for illustrating purposes comprises the strip-producing mill M, continuously providing a strip of uncured softened vulcanizable material from which the articles are blanked and formed. The apparatus further comprises the blanking and molding device F to which the strip is supplied continuously to produce the formed articles therefrom. Both the mill unit M and the blanking and molding unit F are shown to be mounted on a common base. The formed articles are discharged from unit F in a semi-cured state in which they are delivered to an oven or other apparatus T in which they are subjected to finish-curing of vulcanizing to acquire the desired permanent set or resiliency of stabilized rubber, for instance.

The mill M and the blanking and molding unit F are power-driven in synchronism.

The apparatus comprises a base or frame 10, at one end of which is mounted a pair of mill rollers 11 and 12 which, drawing from a quantity or bank B of moldable material such as rubber or thermoplastic material, forms on the roller 13 an enveloping layer 13 of determinate thickness controlled by the spacing between the rollers of the mill. A pair of rotary cutters 14 remove from the layer 13 two strips 15 of determinate width, the void resulting in the layer 13 being constantly filled by migration of the material from the bank B so that the strip 15 is continuous so long as the bank is maintained by replenishing material and the machine is operated.

Upon the other end of the frame there is mounted a carrier or drum-like structure 16 mounted on a shaft 17 for rotation about a horizontal axis. The carrier or drum 16 has two parts 18 and 19 (see Fig. 2). The part 19 has removably mounted on its periphery a series of actuating units 22 closely spaced and each including a cam follower 23. Secured to the frame 10 and overlying the drum part 19 is an arcuate cam support 24 on which suitable cams are adjustably mounted to be engaged by the follower 23 as the drum rotates. Mounted on the part 18 of drum 16 is a series of pairs of co-axially aligned forming dies 25 and 26 which may be separated and brought together and form between them a molding cavity defining the contour of the article to be formed therein. Each pair of the forming dies 25 and 26 constitutes together with their operating unit 22 what is herein termed a molding unit there being a continuous succession of such units mounted around the drum and traveling therewith in a closed path.

As shown, the die members 25 are mounted to move axially and horizontally toward or away from the die members 26, and each die member 25 is connected to an axially aligned actuating unit 22 by which it is operated when the cam follower 23 reaches and is operated by the cams on the cam support 24 during the rotation of the carrier drum 16. The die member 26, in the embodiment of the invention herein illustrated as exemplary thereof, is mounted so as not to be movable for molding purposes.

In the open position of the die members 25 and 26 there is a space 27 (see Fig. 3) between the die members 25 and 26 and it is into this space that the strips 15 are guided from the mill unit M by guides 28a, 28b, 28c and 28d set at such angles that the horizontally disposed strips are twisted to lie in vertical planes when entering the space 27 between the die members substantially tangentially to the cyclic path of the molding units. When so located, movement of the die member 25 to cavity closing position engages the strips 15 and presses them against the die member 26 with sufficient force to sever a blank from the strips and to forcibly fill the cavities in the die members. At the same time the strips 15, which are somewhat wider than the working ends of the two die members 25 and 26, are impaled on the die member which penetrates it and is carried along for a short distance with the drum 16 by the die members. For semi-curing the formed articles, the die members 25 and 26 are heated by conduction or otherwise through their supporting means in any desired manner.

The strips 15 are carried along with the die members only so long as is necessary to control the strips and blank-out the required amount of material. That is to say, the strips are diverted from the cyclic path of the die members as soon as it is practical after the blank to form the articles has been cut, suitably after only a few succeeding die members have thus impaled the strips. After blanking, in order to so divert the strips, the die members themselves in the present illustrative example are formed with transversely disposed cooperating cutting edges $E_1$ and $E_2$ to effect slitting of the lower edge portions of the strips simultaneously with each blanking operation, thus enabling the strips to be pulled or peeled off the die members tangentially away from their cyclic path, while the die members remain closed.

The skeletonized strips travel back to the bank B on the mill rollers 11 and 12, there to commingle with the material of the blank, the strips being assisted in their return movements as by power-driven feed roller 33 and pressure roller 33a engaging them.

In the precision molding operation of the present machine, the formed blank is left enclosed in the die members for a determined time, so that the formed article therein may continue to be subjected to heating sufficient to cause the molding material to flow and fill the cavity (and to over-flow if necessary during its heating up) and thus to become semi-cured to the degree where the article unless forcibly deformed will maintain its shape and size after being discharged from the cavity. Thereafter, the article is subjected to treatment in the oven T to be fully cured or vulcanized. The article may be discharged from the die members 25 and 26 just before the die members are opened or separated from each other to receive the work strips 15.

The improvements of this invention enable the article-forming device to produce special shapes as exemplified by the grommet R which heretofore they had been unable to produce. These improvements furthermore make it possible to have molded into the article structural elements, for example, the inclusion of a washer W as in a molded article A (see Fig. 7).

According to the invention, such specially shaped articles are moldable by the provision of a third recess-forming die member herein, also termed a core member, interposed between the two article-forming dies. The forming dies, when open, have the third die member and the strip interposed between them so that when closing they will cut a blank from the strip forcing the material thereof to fill the cavity around the third die member or core. The strip is then diverted from the die in a suitable manner, the article still remaining in the cavity being semi-cured for a period of time by heat supplied to the dies. Thereafter the article is released from the forming dies and from the third member in a sequence of operations further described below.

A grommet R having a central hole L as well as a peripherally extending groove V is here presented as an example of a spaced shape which, in addition to having an axially disposed recess, has a recess facing transversely or laterally of that which is axially disposed, the term "axially" here designating the axial direction of movement of the forming dies. The grommet R is producible as a precision molded article by the use of the machine herein shown to embody the invention. The grommet R is formed around the core member D with the two forming dies 25 and 26 providing between them the cavity for shaping the body of the grommet as well as the peripheral groove thereof, the groove being disposed in a plane at right angles to the vertical axis of the core member D. Each of the die members 25 and 26 is formed with an identical gouge 25a and 26a respectively (see Fig. 6) fitted around the interposed core member D in order that the grommet-shaped article R may be formed when the forming dies close upon the strip and upon each other as well as upon the core member D.

An auxiliary actuating mechanism H, for example, comprises a horizontal slide rod 38 mounted upon the rotary carrier 16 and movable to reciprocate in a direction parallel to the axial line of movement of the forming dies 25, the slide rod 38 being disposed directly below and parallel to the horizontal axis of the fixed die member 26. At its inner end this slide rod 38 carries at right angles thereto a head portion 39 extending substantially in a common plane with the axial line of movement of the associated forming die 25.

This head portion 39 has the core member D telescopically slideable therein (see Fig. 3), the core member D thus being slideable transversely of the axial movement of the forming dies and in radial direction relative to the rotary carrier or drum 16. The radial movement of the core member D is coupled with the horizontal movement of the slide member 38 (see Fig. 3) by way of the bottom end of core member D engaging in a guide slot 40 provided in a guide plate 41 which in turn is unitary with the rim portion of the rotary carrier 16. The guide plate 41 is fastened to the rotary carrier as by a pair of bolts 42 (see Figs. 2 and 3) and more clearly visible in the enlarged detail view of Fig. 5. The guide slot 40 comprises a horizontal dwell portion 40a and an inclined active portion 40b governing the radial movement of core member D.

The head portion 39 consists of a substantially cylindrical top end portion 39a, and a specially shaped forked lower end portion 39b having a pair of lateral projections 40c and 40d (visible in Figs. 4 and 5) straddling the inner end 38a of slide member 38 and fastened thereto as by means of a pair of lateral screws 40e (see Fig. 4 and Fig. 5).

The end 38a of slide member 38 has a vertical recess 40f to accommodate therein the associated vertical edge portion of the guide plate 41.

The top end 39a of guide portion 39 will thus accommodate a corresponding cylindrical end portion of the core member D, whereas the specially forked lower end portion 39b accommodates a corresponding forked lower end portion of core member D also straddling the guide plate 41. The core member D is complementary to the head portion 39, insofar as it comprises a cylindrical top end portion $p_1$ and a forked lower end portion $p_2$ presenting a pair of prongs $p_3$ and $p_4$ straddling the guide plate 41. The lower ends of the prongs $p_3$ and $p_4$ are interconnected by a transverse pin 42 passing through the guide slot 40 and thus controlling the radial movement of the core member D coupled to the horizontal movement of the slide member 38. It will thus be seen that due to the horizontal movement of the slide member 38, the core member D governed by guide slot 40 will perform a bodily compound movement which is vertical as well as lateral and which is substantially in a common plane with the horizontal axis line of movement of the forming die 25. From Figs. 4 and 5 it will also be seen that the vertical component movement of core member D is always under the control of the guide portion 39 due to the prongs $p_3$ and $p_4$ lodging and sliding vertically in a transverse open slot $S_1$ provided in the head portion 39 by the forked configuration thereof.

This compound movement of core member D serves a dual purpose, namely that of moving the core member with the formed article impaled thereon horizontally away from and clear of the fixed die member 26 after the movable forming die 25 has been backed away, and thereafter stripping the article from the third die member. In other words, after the opening movement of the forming die 25 has started, the core member D first follows it by lateral displacement along the dwell portion 40a of guide slot 40 as indicated by the dot- and dash-line position of that member in Fig. 3, then to be withdrawn radially in the direction of its own longitudinal axis due to the effect of the inclined track portion 40b of guide slot 40, this latter downward withdrawal effecting the stripping of the grommet-shaped article R from the core member D.

The fully withdrawn end position of the core member D appears in Fig. 3 with the pin member at the bottom of the inclined portion 40b and the forming dies separated by the distance 27.

The movement of the slide member 38 is controlled and timed with respect to the movement of the forming die 25 and with respect to a predetermined operating cycle of the machine, by means of a secondary cam roller or cam follower C provided at the outer free end of the slide member 38. This cam follower C faces downwardly to be operatively engaged at both sides thereof by respective secondary cam members $C_1$ and $C_2$ of the secondary track, which in turn are arranged for proper timing of the operation upon a guide rail $C_3$ (see Fig. 1) having rigid and concentric relationship with the main cam track means 24 by the interconnecting bracket structures $C_4$.

It should be noted that the secondary cam follower C operates between the secondary cam members $C_1$ and $C_2$ with sufficient clearance N to provide for a corresponding amount of horizontal or lateral floating movement of core member D along the dwell portion 40a of guide slot 40. Clearance N will enable the core member D to floatingly adjust itself to the closing movement of the forming dies 25 and 26.

Referring to the embodiment of Fig. 7, the core member $D_1$ is specially formed with a shoulder S defining a reduced top end portion $D_2$ for positioning thereon the washer W while the forming dies are open, so that this washer may be incorporated in the article A while being molded around the core member $D_1$, following the forming die members 25c and 26c.

The actuating unit 22 comprises a separate subframe or housing 44, the base of which is removably secured in a keyway 19a by bolts 45 to the part 19 of the drum 16 and in substantial alignment with the axis of the forming dies 25 and 26.

The upper portion of the housing 44 has a guideway 46 to receive a slide bar 47 carrying the cam follower roller 23 for engagement with the cam 30 carried by the cam support 24 mounted on the frame of the machine. The lower part of the slide bar 47 carried a block 48 having a vertical slot 49 in which rides a roller 50 on a bell crank 51. The bell crank 51 has a pin 52 carried by a slide bar or thrust rod 53 providing the relatively fixed pivot point of the bell crank 51. The bell crank 51 has a pivotal connection 54 with a link 55 pivotally connected to 56 to the die member 25 which reciprocates in a ring or guideway 64 forming part of the drum part 18 of the rotary carrier 16. With slide bar 47 in the position shown corresponding to the position of link 55 in Fig. 3 the die member 25 is retracted, but when it is moved by one of the cams 30 to the right as shown in Fig. 2, the forming die 25 is thereby advanced and the pivotal connections 52, 54 and 56 between bar 53, the bell crank 51 and the link 55 are brought into horizontal alignment so that any force tending to push the die member to open position will necessarily have to move the pivot point 52 for the bell crank, since the latter and the link 55 constitute a toggle which is locked in the extended or cavity-closing position of the forming die 25. Preferably, the bell crank 51 overthrows its pivotal connection 54 with the link 55 slightly beyond dead center or beyond the straight line between the pivot point 52 and the pivot point 56 on the die member 25, against an abutment surface 58. In this position the toggle members 51 and 55 are self-locked and will remain so without the follower cam roller 23 engaging the cam 30, and thus the load of keeping the toggle locked need not be absorbed by the stationary cam structure with the attendant loss of frictional energy, but is sustained entirely by the drum or rotary carrier structure 16. Unlocking of the toggle mechanism is effected by the follower cam roller 23 being engaged by suitable cam surfaces provided on the supporting structure 24.

In order to maintain the die cavity closed under a resiliently yielding force, the thrust rod 53 with the pivot point 52 for bell crank 51 is slideable in the housing 44 of the operating unit 22. The end of the thrust rod 53 has a head 60 extending beyond the housing 44 and normally engaging it as a stop to limit the inward movement of the rod. Engaging the head 60 of the thrust rod 53 is the coil spring 35 the outer end of which engages a terminal member 61 held by an adjusting screw 62 which is threaded into an extension 63 of the housing 44. With the toggle mechanism extended and locked, and the forming dies 25 and 26 closed upon each other, any thrust force tending to open it, for instance the expansion of the material contained within the die cavity, is transmitted through link 55, bell crank 51 and pivot point 52 to the thrust rod 53 which may move accordingly as the yielding resiliency of spring 35 permits. However, when this thrust force is released, the spring 35 acting through the parts 53, 52, 51 and 55, will return the forming die 25 to its cavity-closing position relative to the fixed forming die 26. The same action takes place when the movable forming die 25 is initially closing upon and penetrating the strip 15 of molding material, for if the resistance to penetration is too great, considering the speed of movement of the forming die, spring 35 will yield initially and then return to its normal cavity-closing position after the material has had sufficient time to squeeze out from between the die members 25 and 26. The spring 35 also permits the slight recession of the pivot point 52 of the bell crank 51 whenever the intermediate connecting pivot 54 of the toggle mechanism moves past dead center and against abutment 58.

Thus, the spring 35 not only acts as a safety feature preventing damage to the forming dies 25 and 26 if they were pressed together with unyielding force, but also serves as a follow-up device to close the dies one against the other even when resistance to the movable die ceases.

According to Fig. 3 the rings 64 and 65 on part 18 of carrier 16 carry the fixed and relatively movable forming dies 25 and heating chambers 66 with pipe connections 67 for supplying to them steam or other temperature controlling fluid.

The diagrammatic Figures 10 to 13 illustrate one embodiment of the article-forming operating cycle of the molding devices, where the relatively fixed die is designated 26', the axially movable die 25', the third die member D' having movable supporting means M' for imparting to this die member a sequence of movements in Figures 11, 12, 13. Also indicated in this embodiment is the novel use simultaneously of a pair of strips $P_1$ and $P_2$ of molding material fed to the molding device with the third die member imposed between the strips. The supporting means M' provide for certain vertical and horizontal movements to be imparted to the third die member D' in correlation to the axial movement of the forming dies.

Figure 10 shows the forming die 25' about to close upon the fixed forming die 26' as well as upon the interposed third die member and the strips. Accordingly, arrows $A_1$ and $A_2$ indicate the closing movement of the die 25' and support M' horizontally to the right.

In Figure 11 the forming dies have closed, the article or grommet has been formed therein around the third die member, with die 25' and support M' about to move to the left according to arrows $A_3$ and $A_4$ to initiate the opening movement of the dies.

In Figure 12 the dies have reached their extreme open position, with the third die member having the grommet impaled thereon about to be withdrawn downwardly according to arrow $A_5$.

Figure 13 shows the third die member thus withdrawn and the grommet thereby stripped from that member for discharge. Next, the parts may be restored to the Figure 10 position for initiating a new operating cycle.

The embodiment of the article-forming cycle of Figures 14 to 17 starts with the conditions of Figures 14 and 15 resembling those of Figures 10 and 11, although with arrow $A_6$ indicating the third die member about to be withdrawn downwardly. In Figure 16 the third die member has been withdrawn prior to the opening of the forming dies, leaving the grommet behind in the cavity of the forming dies, but with the die 25' about to open as indicated by arrow $A_7$.

In Figure 17 the dies are open with the grommet ready to be discharged from the cavity of die 26'. Next, the parts may again be positioned as per Figure 14 for the start of a new operating cycle.

While these operations are automatically performed in the machine embodying this invention, since they can be executed manually, a method of so producing molded articles comprises interposing a quantity of molding material between a pair of forming dies at least one of which has a recess forming projection in its cavity in the presence of an interposed third die member or core member adapted to project into the closed molding cavity formed between the molding dies when closed, bringing the forming dies together in a coaxial line of movement to close upon the core member forcing the material to fill the cavity around the core member to form the article, and effecting the separation of the formed article from the forming die and from the core member by a relative sequence of operations comprising the opening of the forming dies and the stripping of the formed article from the core member.

According to a novel feature of this invention (see Figs. 1 and 18) a pair of strips 15 of the molding material are guided simultaneously to the travelling molding dies in such a manner as to straddle the hole forming core member or third die member in order to facilitate having the material flow around the core member while forcibly filling the cavities of the forming dies in the process of molding the article. The manner in which the strips 15 are guided to the molding dies is generally indicated in Fig. 1, and more clearly in the perspective detail Fig. 18 showing the pair of strips 15 travelling in an identical substantially horizontal plane over the guide roller 28d, thence downwardly to be twisted each into a vertical plane by a pair of guide bars 28e held in the desired position by a bracket arm 28f adjustably carried by a stationary part of the machine, with the two strips straddling the path of the sequential core members travelling co-directionally with the strips.

Variations and modifications may be made within the scope of the claims and portions of the improvements may be used without others.

I claim:

1. In a molding machine for producing in continuous succession articles, having a base, a carrier having a series of article-forming units traveling in an endless path with each unit having a pair of coaxial cooperative forming-dies together providing a molding cavity, means for causing said dies to open in succession at a discharge station and to be open at a loading station, means for guiding a continuous strip of molding material between said forming-dies while the latter are respectively at said loading station, and means to close each pair of forming-dies and blank out from said strip a quantity of molding material sufficient to fill the molding cavity: the improvement comprising core means for each of said pairs of forming-dies cooperating therewith to form an article mounted on the carrier independently of said pairs of dies, and means for moving each of said core means into cooperating position between its related pair of forming-dies at said loading station and retracting said core means from said position at said article-discharging station.

2. The improvement as defined in claim 1, in which there are cooperating means on the carrier and on the base for operating the means for moving the core means into and out of said cooperating position as the carrier travels in its endless path.

3. The improvement as defined in claim 1, in which the carrier is a wheel having two spaced flanges each carrying one of the dies of each cooperating pair, and said core means are carried by said wheel in the space between said flanges.

4. The improvement as defined in claim 1, in which said core means has means to effect the formation of a recess in said article extending transversely to the axis of the forming-dies.

5. The improvement as defined in claim 1, in which said forming-dies have means for forming a recess in the molded article and said core means has means to effect the formation of another recess in said article extending transversely of the axis of the forming-dies.

6. The improvement as defined in claim 1, in which the core means is retracted from its interposed position before the forming-dies of the cooperating pair are opened at the discharge station whereby the core means is stripped from the article.

7. The improvement as defined in claim 1, in which the forming-dies of the cooperating pair are opened at the discharge station before the core means is retracted, and there are means for stripping the article from the core means incident to its retracting movement.

8. The improvement as defined in claim 1, in which there are means on the forming-dies of each pair for controlling the position of the core means between them.

9. The improvement as defined in claim 8, in which the core means in its interposed position is bodily movable in the direction of the closing movement of the pair of forming-dies.

References Cited in the file of this patent

UNITED STATES PATENTS

| | | |
|---|---|---|
| 2,200,633 | Morin et al. | May 14, 1940 |
| 2,203,694 | Morin et al. | June 11, 1940 |
| 2,207,600 | Seaver et al. | July 9, 1940 |
| 2,209,413 | Marinsky | July 30, 1940 |
| 2,293,633 | Shaw | Aug. 18, 1942 |
| 2,477,368 | Gits | July 26, 1949 |
| 2,688,159 | Swartz et al. | Sept. 7, 1954 |
| 2,718,032 | Harvey | Sept. 20, 1955 |

FOREIGN PATENTS

| | | |
|---|---|---|
| 200,047 | Australia | Nov. 2, 1955 |